US 8,045,520 B2

(12) United States Patent
Zeira et al.

(10) Patent No.: US 8,045,520 B2
(45) Date of Patent: Oct. 25, 2011

(54) DOWNLINK POWER CONTROL FOR MULTIPLE DOWNLINK TIME SLOTS IN TDD COMMUNICATION SYSTEMS

(75) Inventors: Eldad Zeira, Huntington, NY (US);
Stephen E. Terry, North Port, NY (US);
Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1549 days.

(21) Appl. No.: 09/845,803

(22) Filed: Apr. 30, 2001

(65) Prior Publication Data

US 2002/0031105 A1 Mar. 14, 2002

Related U.S. Application Data

(60) Provisional application No. 60/200,756, filed on May 1, 2000.

(51) Int. Cl.
*H04L 12/26* (2006.01)
(52) U.S. Cl. .......................................................... 370/330
(58) Field of Classification Search .................. 370/310, 370/314, 318, 320, 333; 455/422.1, 522, 455/560; 714/708, 704; 375/259, 295, 320
See application file for complete search history.

(56) References Cited

U.S. PATENT DOCUMENTS

| | | | | |
|---|---|---|---|---|
| 5,461,639 A | * | 10/1995 | Wheatley et al. | ............. 370/342 |
| 5,898,925 A | | 4/1999 | Honkasalo et al. | |
| 6,035,210 A | * | 3/2000 | Endo et al. | ..................... 455/522 |
| 6,038,220 A | | 3/2000 | Kang et al. | |
| 6,341,224 B1 | | 1/2002 | Dohi et al. | |
| 6,549,785 B1 | * | 4/2003 | Agin | .............................. 455/522 |
| 6,690,652 B1 | * | 2/2004 | Sadri | ............................... 370/342 |
| 2002/0016177 A1 | * | 2/2002 | Miya et al. | ..................... 455/522 |
| 2002/0031105 A1 | | 3/2002 | Zeira et al. | |

FOREIGN PATENT DOCUMENTS

| | | |
|---|---|---|
| CN | 1128604 | 8/1996 |
| CN | 1198274 | 11/1998 |
| DE | 19909299 | 9/2000 |
| DE | 19917061 | 11/2000 |
| DE | 19957299 | 6/2001 |
| EP | 0977371 | 2/2000 |
| EP | 1139685 | 10/2001 |

(Continued)

OTHER PUBLICATIONS

Third Generation Partnership Project, "Technical Specification Group Radio Access Network; Multiplexing and Channel Coding (TDD) (Release 1999)," 3GPP TS 25.222 V3.6.0 (Mar. 2001).

(Continued)

*Primary Examiner* — Raj Jain
(74) *Attorney, Agent, or Firm* — Volpe and Koenig, P.C.

(57) ABSTRACT

The present invention is a method and system for controlling downlink transmission power levels in a spread spectrum time division communication system having frames with time slots for communication, which receives at a user equipment (UE) a downlink communication from a base station and determines an error rate of the received communication. The UE then produces power level adjustments for each of the time slots based in part on the error rate and transmits an uplink communication to the base station which includes the power level. In response to the power level adjustments and (or) other information, transmission power level is set for each time slot in the downlink communication.

7 Claims, 10 Drawing Sheets

FOREIGN PATENT DOCUMENTS

| WO | 00/64069 | 10/2000 |
|----|----------|---------|
| WO | 00/65748 | 11/2000 |
| WO | 0065748  | 11/2000 |
| WO | 01/41328 | 6/2001  |

OTHER PUBLICATIONS

Third Generation Partnership Project, "Technical Specification Group Radio Access Network; Multiplexing and Channel Coding (TDD)(Release 4)," 3GPP TS 25.222 V4.0.0 (Mar. 2001).

Third Generation Partnership Project, "Technical Specification Group Radio Access Network; Multiplexing and Channel Coding (TDD) (Release 1999)," 3G TS 25.222 V3.2.0 (Mar. 2000).

Third Generation Partnership Project, "Technical Specification Group Radio Access Network; Physical Layer Procedures (TDD) (Release 4)," 3GPP TS 25.224 V4.0.0 (Mar. 2001).

Third Generation Partnership Project, "Technical Specification Group Radio Access Network; Physical Layer Procedures (TDD) (Release 1999)," 3GPP TS 25.224 V3.6.0 (Mar. 2001).

Third Generation Partnership Project, "Technical Specification Group Radio Access Network; Physical Layer Procedures (TDD) (Release 1999)," 3GPP TS 25.224 V3.2.0 (Mar. 2000).

* cited by examiner

DOWNLINK POWER CONTROL FOR MULTIPLE DOWNLINK TIME SLOTS IN TDD COMMUNICATION SYSTEMS

BACKGROUND

This invention generally relates to spread spectrum time division duplex (TDD) communication systems. More particularly, the present invention relates to a system and method for controlling downlink transmission power within TDD communication systems.

Spread spectrum TDD systems carry multiple communications over the same spectrum. The multiple signals are distinguished by their respective chip code sequences (codes). Referring to FIG. 1, TDD systems use repeating frames 34 divided into a number of time slots $37_1$-$37_{n_s}$, such as fifteen time slots. In such systems, a communication is sent in a selected time slot out of the plurality of time slots $37_1$-$37_n$ using selected codes. Accordingly, one frame 34 is capable of carrying multiple communications distinguished by both time slot and code. The combination of a single code in a single time slot is referred to as a physical channel. Based on the bandwidth required to support a communication, one or multiple physical channels are assigned to that communication.

Most TDD systems adaptively control transmission power levels. In a TDD system, many communications may share the same time slot and spectrum. While user equipment (UE) 22 is receiving a downlink transmission from a base station, all the other communications using the same time slot and spectrum cause interference to the specific communication. Increasing the transmission power level of one communication degrades the signal quality of all other communications within that time slot and spectrum. However, reducing the transmission power level too far results in undesirable signal to noise ratios (SNRs) and bit error rates (BERs) at the receivers. To maintain both the signal quality of communications and low transmission power levels, transmission power control is used.

The standard approach to TDD downlink power control is a combination of inner and outer loop control. In this standard solution, the UE transmits physical layer transmit power control (TPC) commands to adjust the base station transmission power. A base station sends a transmission to a particular UE. Upon receipt, the UE measures the signal interference ratio (SIR) in all time slots and compares this measured value to a $SIR_{TARGET}$. This $SIR_{TARGET}$ is generated from the Block Error Rate (BLER) signaled from the base station.

As a result of the comparison of the measured SIR value with the $SIR_{TARGET}$, the UE transmits a TPC command to the base station. The standard approach provides for a TPC command per coded composite transport channel (CCTrCH). The CCTrCH is a physical channel which comprises the combined units of data for transmission over the radio interface to and from the UE or base station. This TPC command indicates to the base station to adjust the transmission power level of the downlink communication. The base station, which is set at an initial transmission power level, receives the TPC command and adjusts the transmit power level in all time slots associated with the CCTrCH in unison.

This approach to TDD downlink power control works well as long as the interference in each time slot is the same. Unfortunately, in most cases, the interference in each time slot is different. A small difference may be acceptable due to the averaging effect of the interleaving, but larger differences cause degradation due to thresholding effects in the receiver. This requires the receiver to have a wider dynamic range and unnecessarily high transmit power in some time slots. An adjustment made to the base station $SIR_{TARGET}$ for all time slots based on the error value may create an unbalanced increase or decrease of the power level. In other words, those time slots where the power level was lower than the initial value of the base station will be adjusted even lower when the calculated error value was higher than the $SIR_{TARGET}$. These low level power time slots may then be eliminated from detection, thereby the transmission will be degraded. The same is true for those time slots in which the power level was higher than the $SIR_{TARGET}$ of the base station. When the detected error rate is lower than the $SIR_{TARGET}$, the higher power level time slots will be increased, thereby creating interference with other channels on the system.

Accordingly, there is a need to have an approach to TDD downlink power control which adjusts the power level of each slot individually.

SUMMARY

The present invention is a method and system for controlling downlink transmission power levels in a spread spectrum time division communication system having frames with time slots for communication, which receives at a user equipment (UE) a downlink communication from a base station and determines an error rate of the received communication. The UE then produces power level adjustments for each of the time slots based in part on the error rate and transmits an uplink communication to the base station which includes the power level adjustment for each of the time slots. In response to the power level adjustments transmission power level is set for each time slot in the downlink communication.

BRIEF DESCRIPTION OF THE DRAWING(S)

FIGS. 3A and 3B illustrate block diagrams of a UE and base station, respectively.

DETAILED DESCRIPTION OF THE PREFERRED EMBODIMENT(S)

Figure 1:
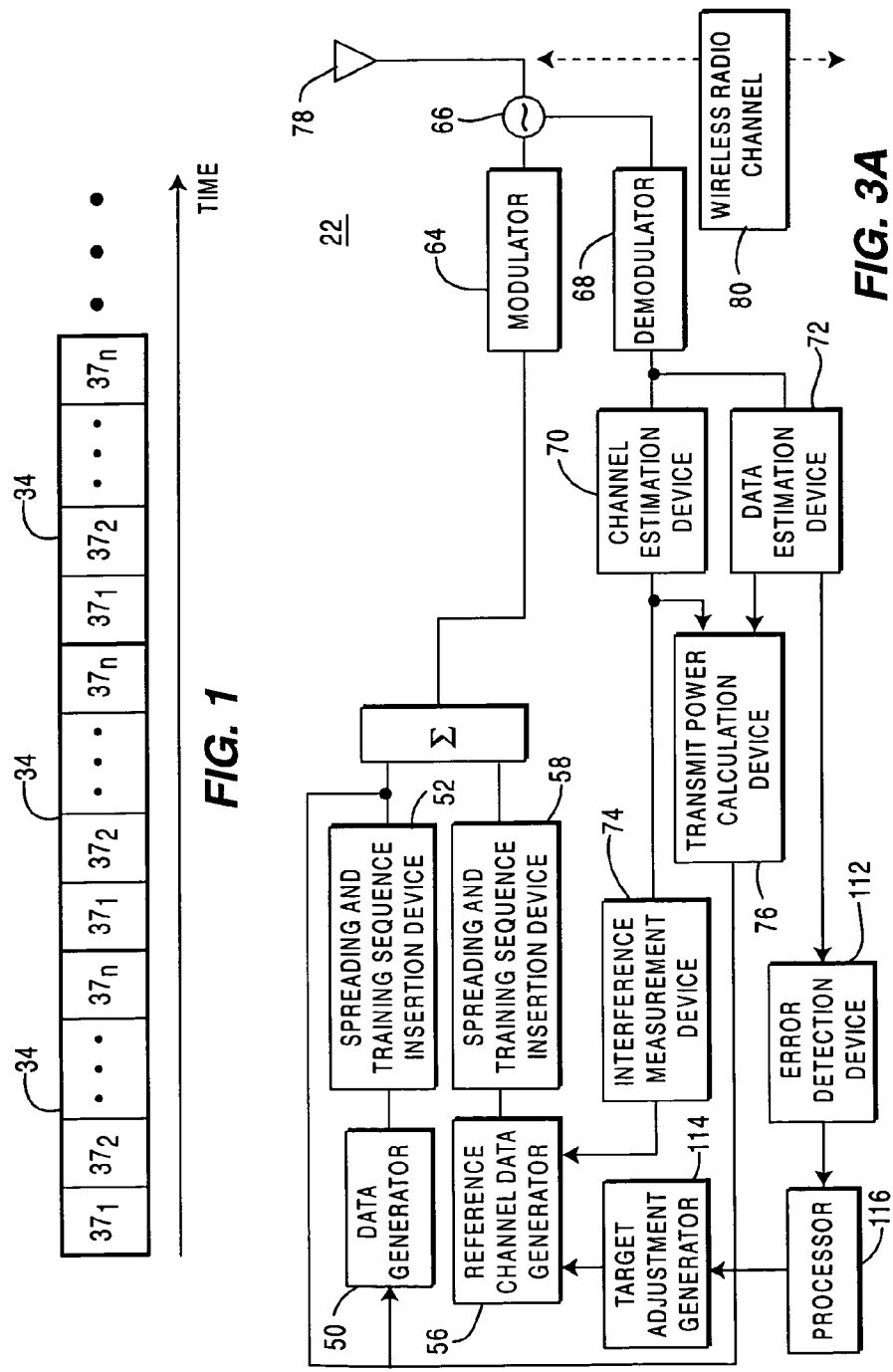
FIG. 1 illustrates time slots in repeating frames of a TDD system.

The preferred embodiments will be described with reference to the drawing figures where like numerals represent like elements throughout.

Figure 2:
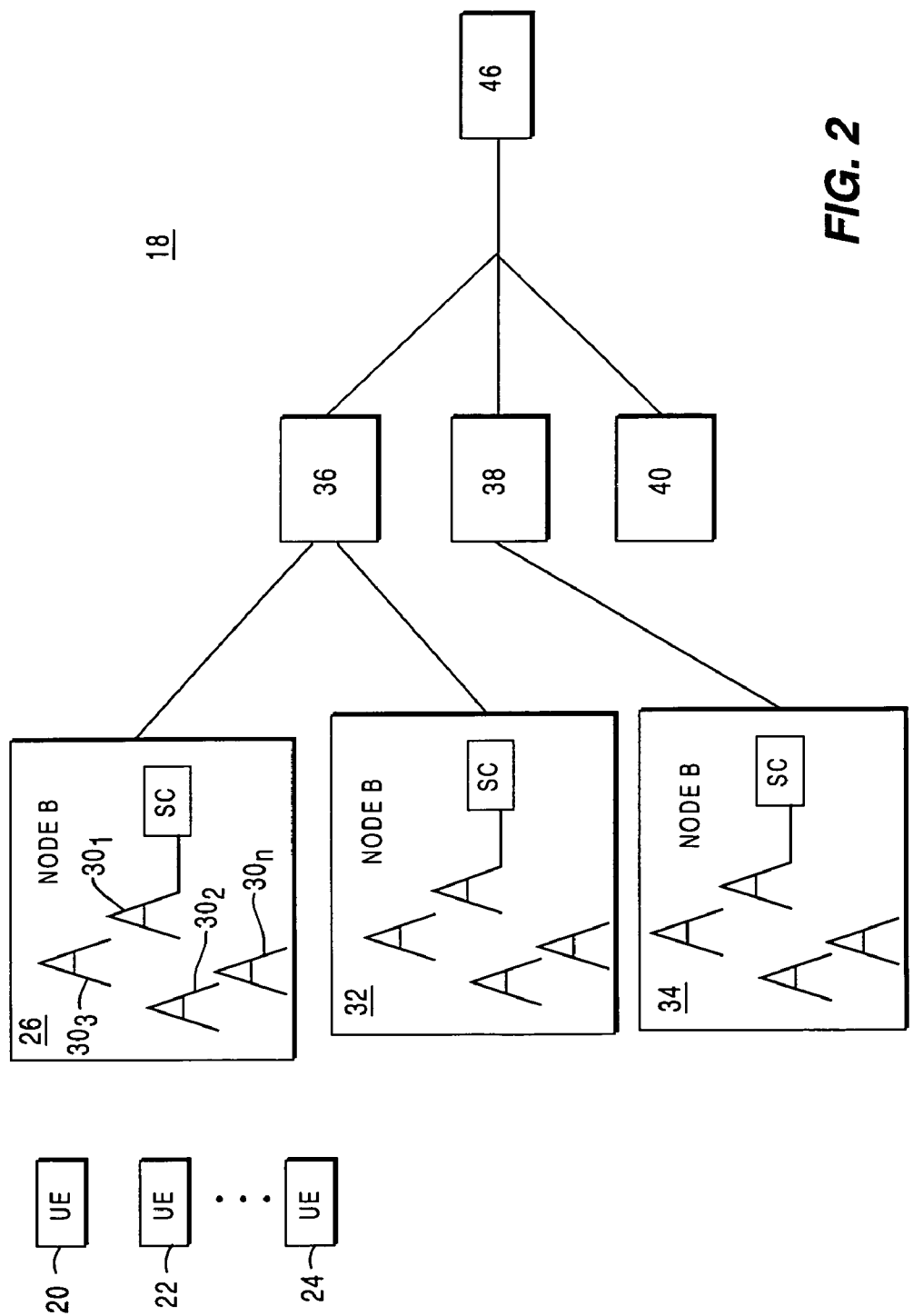
FIG. 2 illustrates a simplified wireless TDD system.

FIG. 2 illustrates a simplified wireless spread spectrum code division multiple access (CDMA) or time division duplex (TDD) communication system 18. The system 18 comprises a plurality of node Bs 26,32,34, a plurality of radio network controllers (RNC),36,38,40, a plurality of UEs 20,22,24 and a core network 46. The plurality of node Bs 26, 32, 34 are connected to a plurality RNCs 36,38,40, which are, in turn, connected to the core network 46. Each Node B, such as Node B 26, communicates with its associated user equipment 20-24 (UE). The Node B 26 has a single site controller (SC) associated with either a single base station $30_1$, or multiple base stations $30_1 \ldots 30_n$.

Although the present invention is intended to work with one or more UEs, Node Bs and RNCs, for simplicity of explanation, reference will be made hereinafter to the operation of a single UE in conjunction with its associated Node B and RNC.

Referring to FIG. 3A, the UE 22 comprises an antenna 78, an isolator or switch 66, a modulator 64, a demodulator 68, a channel estimation device 70, data estimation device 72, a transmit power calculation device 76, an interference measurement device 74, an error detection device 112, a processor 111, a target adjustment generator 114, a reference channel data generator 56, a data generator 50, and two spreading and training sequence insertion devices 52, 58.

The UE 22 receives various radio frequency (RF) signals including communications from the base station $30_1$ over the wireless radio channel using an antenna 78, or alternatively an antenna array. The received signals are passed through a T/R switch 66 to a demodulator 68 to produce a baseband signal. The baseband signal is processed, such as by a channel estimation device 70 and a data estimation device 72, in the time slots and with the appropriate codes assigned to the UEs 22 communication. The channel estimation device 70 commonly uses the training sequence component in the baseband signal to provide channel information, such as channel impulse responses. The channel information is used by the data estimation device 72, the interference measurement device 74 and the transmit power calculation device 76. The data estimation device 72 recovers data from the channel by estimating soft symbols using the channel information.

Prior to transmission of the communication from the base station $30_1$, the data signal of the communication is error encoded using an error detection/correction encoder 112. The error encoding scheme is typically a cyclic redundancy code (CRC) followed by a forward error correction encoding, although other types of error encoding schemes may be used. As those skilled in the art know, the data is typically interleaved over all of the time slots and all codes.

Using the soft symbols produced by the data estimation device 72, the error detection device 112 detects errors in the frame. Each time a frame is determined to have an error, a counter is incremented. This counter value becomes the block error rate (BLER). A processor 111 in the UE 22 typically determines a target signal to interference ratio SIR value based on the measured BLER and determines a signal to interference ratio $SIR_{UE}$ for all time slots. Based on the $SIR_{UE}$, the processor 11 determines the adjustment of the base station transmit power by comparing the $SIR_{UE}$ with the $SIR_{TARGET}$. Based on this comparison, a TPC command is generated by the target adjustment generator 114 for each time slot. Each TPC command is subsequently sent to the base station.

In a first embodiment of the present invention, the target adjustment generator 114 in the UE 22 generates and transmits TPC commands in each time slot of the CCTrCH. The TPC command in each time slot indicates to the base station $30_1$ to adjust the downlink transmission power level for each time slot. The uplink physical channel comprises these TPC commands for each slot associated with the CCTrCH, and is communicated to the base station for processing. These TPC commands may be transmitted in a single uplink physical channel, or spread over several uplink physical channels.

Figure 3B:
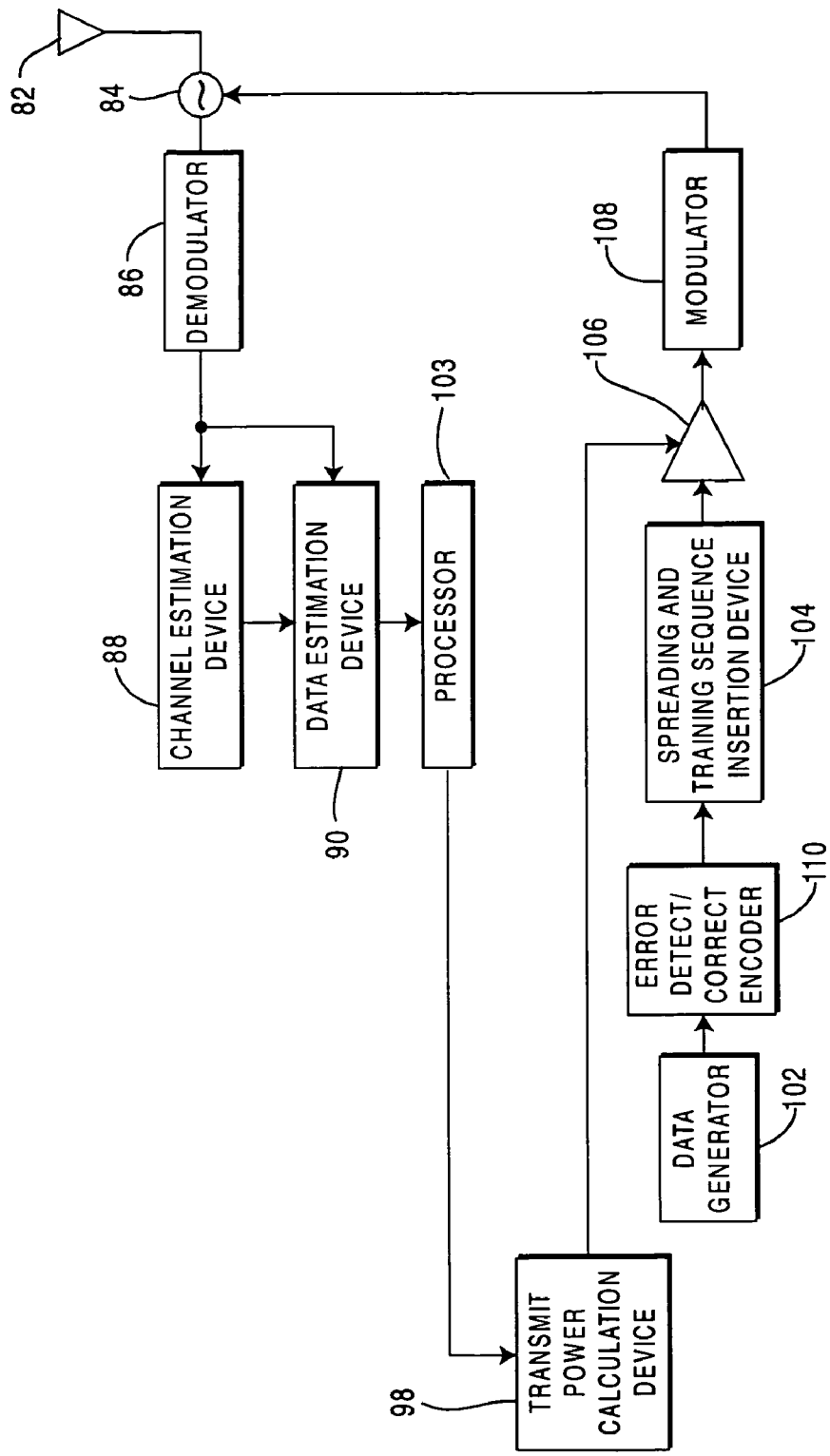

Referring to FIG. 3B, a base station made in accordance with the first embodiment of the present invention is illustrated. The antenna 82 or, alternately, antenna array of the base station $30_1$ receives various RF signals including the TPC commands. The received signals are passed via a switch 84 to a demodulator 86 to produce a baseband signal. Alternatively separate antennas may be used for transmit or receive functions. The baseband signal is processed, such as by a channel estimation device 88 and a data estimation device 90, in the time slots and with the appropriate codes assigned to the communication burst of the UE 22. The channel estimation device 88 commonly uses the training sequence component in the baseband signal to provide channel information, such as channel impulse responses. The channel information is used by the data estimation device 90. The data information is provided to the transmit power calculation device 98 by processor 103.

Processor 103 converts the soft symbols produced by the data estimation device 90 to bits and extracts the TPC commands for each time slot associated with the CCTrCH. The transmit power calculation device 98 combines the TPC commands with the $SIR_{target}$ to determine the transmission power for each time slot associated with the CCTrCH.

Data to be transmitted from the base station $30_1$ is produced by data generator 102. The data is error detection/correction encoded by error detection/correction encoder 110. The error encoded data is spread and time-multiplexed with a training sequence by the training sequence insertion device 104 in the appropriate time slot(s) and code(s) of the assigned physical channels, producing a communication burst(s). The spread signal is amplified by an amplifier 106 and modulated by modulator 108 to radio frequency. The gain of the amplifier is controlled by the transmit power calculation device 98 to achieve the determined transmission power level for each time slot. The power controlled communication burst(s) is passed through the isolator 84 and radiated by the antenna 82.

Figure 4:
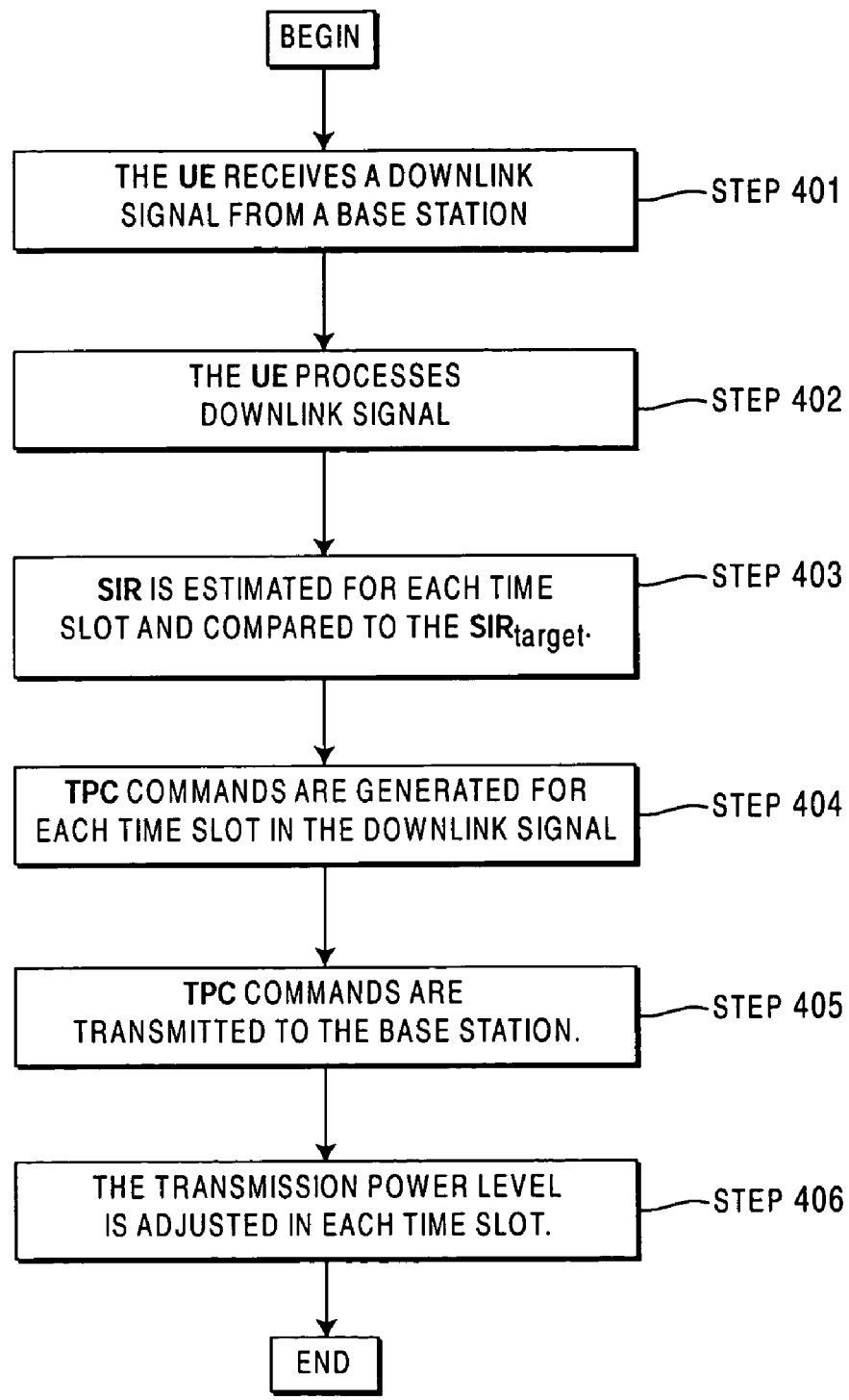
FIG. 4 illustrates a flow diagram of a first embodiment.

A flow diagram illustrating the method of downlink power control in accordance with the first embodiment of the present invention is shown in FIG. 4. The UE 22 receives a downlink signal from the base station $30_1$, (step 401), which is then processed by the UE 22 (step 402). The UE 22 then determines the SIR for each time slot of the CCTrCH and compares it to the $SIR_{target}$ (step 403). The UE then generates a TPC command for each time slot (step 404). The TPC commands are transmitted to the base station $30_1$ associated with the UE 22, (step 405), which adjusts the transmission power per time slot of the CCTrCH (step 406).

The use of TPC commands for every time slot provides the communication system with a simple method of equalizing the signal to interference ratio (SIR) in all downlink slots. Since the interference level in different time slots is generally different, this method of the first embodiment of the present invention accounts for this difference and generates a separate TPC command for each time slot to adjust the power level of each time slot in the downlink signal.

A second embodiment of the present invention presents an alternative approach for balancing the adjustment to the power level individually in each time slot, during downlink transmission by utilizing the time slot interference data from each time slot, a measured downlink interference signal code power (ISCP). This ISCP measurement is made by the UE 22 from time to time, determined by interference rate of change and the amount of interference difference that can be tolerated by the UE 22 without degradation.

This second embodiment utilizes the time slot interference data from each time slot to equalize the SIR in different slots to counter the fact that the interference is different in each slot. As will be explained in greater detail hereinafter, a TPC command per CCTrCH along with interference information for each slot are used to adjust the transmission power. The difference between the interference in different time slots modifies the values that are obtained from the TPC commands. Therefore, although the interference in each time slot may be different, use of the ISCP information maintains approximately the same SIR in all time slots.

The UE 22, at each frame, sends a TPC command that corresponds to the average SIR in all time slots that belong to the same CCTrCH. The base station $30_1$, then constructs an average transmit power per CCTrCH based on the received TPC commands. As will be explained in greater detail hereinafter, the base station $30_1$, then modifies the average power to obtain the transmit power for each time slot for the CCTrCH, based on the relevant interference data and the time slot mapping used. It should be noted that this alternate approach allows the use of multiple spreading factors.

Figure 6:
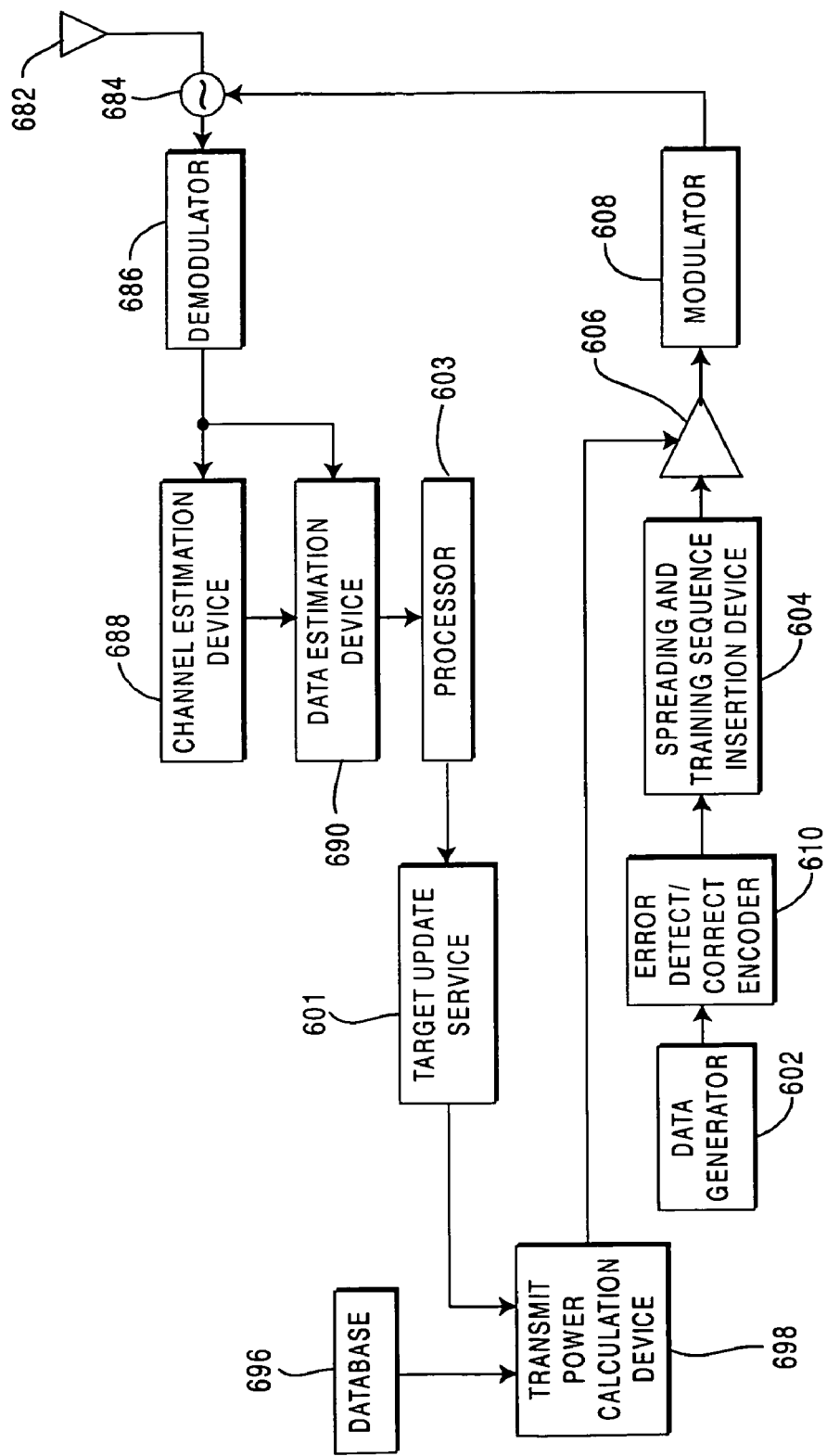
FIG. 6 illustrates a block diagram of the base station made in accordance with the second embodiment.

Referring to FIG. 6, a base station made in accordance with this second embodiment is illustrated. The transmit power calculation device 698 within the base station $30_1$ initializes the downlink power control approach of the second embodiment by combining the interference and spreading code information to estimate equivalent power obtained from the TPC commands P.

$$\overline{P} = (F/N)\Sigma_j I_j \Sigma_k 1/S_{jk} \qquad \text{Equation 1}$$

where j and k refer to time slot and physical channel respectively; N is the total number of physical channels at spreading factor of 16 in one slot. $I_j$ represents the interference in time slot j, j=1, ... N; F is a scaling factor and $1/S_{jk}$ is the spreading factor.

The transmit power calculation device 698 then, using the interference per time slot and the mapping information stored in the base station data base 696, calculates the scaling factor F in accordance with the following equation:

$$F = NP/(\Sigma_j I_j \Sigma_k 1/S_{jk}) \qquad \text{Equation 2}$$

and the transmit power for all physical channels $P_{jk}$ according to Equation 3:

$$P_{jk} = FI_j 1/S_{jk} \qquad \text{Equation 3}$$

The power per time slot is defined as:

$$P_j = FI_j \Sigma_k 1/S_k \qquad \text{Equation 4}$$

During steady state operation, the transmit power calculation device 698 updates the scaling factor F for each physical channel whenever new downlink interference signal code power (ISCP) measurements I for each time slot associated with the particular downlink CCTrCH are available. In order for the transmit power calculation device 698 to calculate the scaling factor F, the spreading factor for each physical channel is used. The transmit power calculation device 698 calculates the transmit power using the ISCP measurement I which is made available to the transmit power calculation device 698 either periodically or whenever new interference information warrants an update.

When a new ISCP measurement I is made, the measurement is transferred to the base station $30_1$ for calculation of the transmit power for each physical channel. If a new ISCP measurement I is not available, the TPC command from the UE 22 is used to modify P in the standard way, and the transmit power for all physical channels $P_{jk}$ is calculated therefrom.

Figure 5:
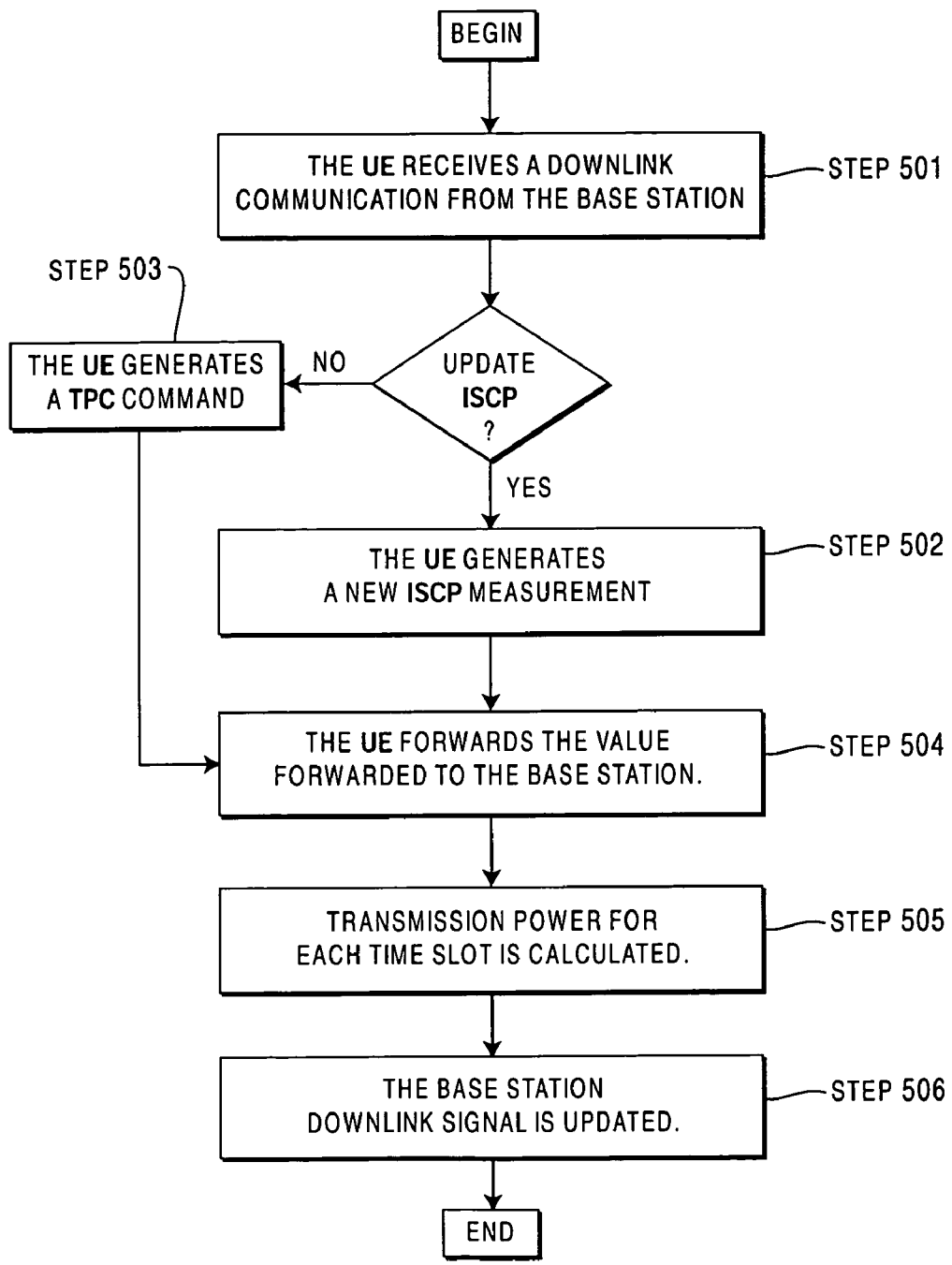
FIG. 5 illustrates a flow diagram of a second embodiment.

Referring to FIG. 5, a flow diagram of downlink power control in accordance with this second embodiment is illustrated. The UE 22 receives a downlink communication from the base station $30_1$ (step 501). If the UE 22 determines an updated ISCP measurement is required, the UE 22 makes an ISCP measurement for each time slot in the downlink communication and forwards the new ISCP measurements to the base station $30_1$ (step 502). Otherwise the UE 22 generates a TPC command and forwards it to the base station (step 503). The base station 30 calculates the scaling factor for all physical channels (step 504) using the TPC command or ISCP measurement from the UE 22. The transmission power level for each time slot is then calculated by the base station $30_1$ (step 505) and the downlink signal updated accordingly (step 506).

It should be noted that even though the second embodiment has been described with the base station storing all required information and conducting all calculations on its own, the Node B 26 and RNC 36 may perform this function instead. Referring to FIG. 6, a flow diagram illustrates a third embodiment downlink power control system wherein the Node B 26 and RNC 36 are involved. The UE 22 receives a downlink communication from the base station $30_1$ (step 701). If the UE 22 determines an updated ISCP measurement is required, the UE 22 makes an ISCP measurement for each time slot in the downlink communication and forwards the new ISCP measurements to the RNC 36 (step 702). Otherwise the UE 22 generates a TPC command and forwards it to the base station RNC 36 (step 703). If the downlink power control system is set up to have the RNC 36 calculate the transmit power, the transmit power for each time slot is calculated by the RNC 36 (step 704) and then forwarded to the Node B 26 in order to update the base station $30_1$ downlink signal (step 706). If the Node B 26 is setup to calculate the transmit power, the RNC 36 transmits the ISCP or TPC connected to the Node B 26 (step 705) where the transmit power for each time slot is calculated (step 706).

A fourth embodiment for downlink power level control utilizes time slot interference data similar to that disclosed in the second embodiment above. In this approach though, time slot interference is calculated from knowledge of the allocated downlink physical channels by the base station $30_1$, and loading information and path loss from all neighbor base stations to the UE 22, rather than requiring explicit ISCP measurements from the UE 22. Each base station, such as base station $30_1$, knows all allocated channel configurations for the UE's 22 specific base station $30_1$, as well as other neighbor base stations $30_2 \ldots 30_n$. Obviously, if there is only one base station $30_1$, no additional information from other base stations is required. The base station $30_1$ must also know the load and path loss information of all neighboring base stations from the neighboring base stations to the UE 22.

When there are multiple base stations, the UE 22 typically measures the primary common control physical channel (PC-CPCH) power of base stations under the control of its base station's Node B 26 and all other base stations. The base station $30_1$ uses the known PCCPCH transmission power and the power measurement of same as received by the UE to estimate the path loss between the UE and each of the neighbor base stations.

Referring again to FIG. 6, the base station database 696 has stored therein the loading information which specifies the physical channels in the neighbor base station by time slot. This loading information is combined with the PCCPCH. The received signal code power (RSCP) for the particular base station is used to estimate the interference effect of the neighboring base station. From these calculations, the interference at the UE 22 can be calculated. For a non-multiple user detection (MUD) UE, the interference of its associated base station and the interference of the neighboring base stations are used to calculate this value. For a MUD UE, interference generated by the UE's associated base station is excluded from the UE interference value.

The estimated interference, I(n), using known loading information is calculated by the transmit power calculation device 698 as:

$$I(n)=\Sigma P_j(n)L_j(n) \qquad \text{Equation 5}$$

Applying this estimated interference value to Equations 1 through 4, the transmit power calculation device 698 calculates the transmit power for each time slot.

Figure 8:
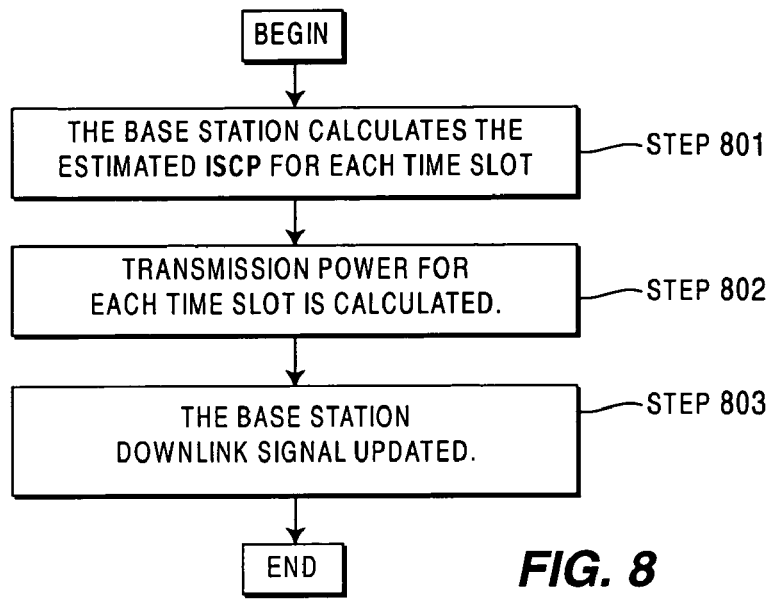
FIG. 8 illustrates a flow diagram of a fourth embodiment.

Referring to FIG. 8, a flow diagram of downlink power control in accordance with this fourth embodiment is illustrated. The base station 30$_1$ calculates the estimated interference I for each time slot (step 801) and then calculates the transmission power level for each time slot (step 802) using Equations 1 thru 5 above, which updates the base station downlink signal is updated (step 803).

Figure 9:
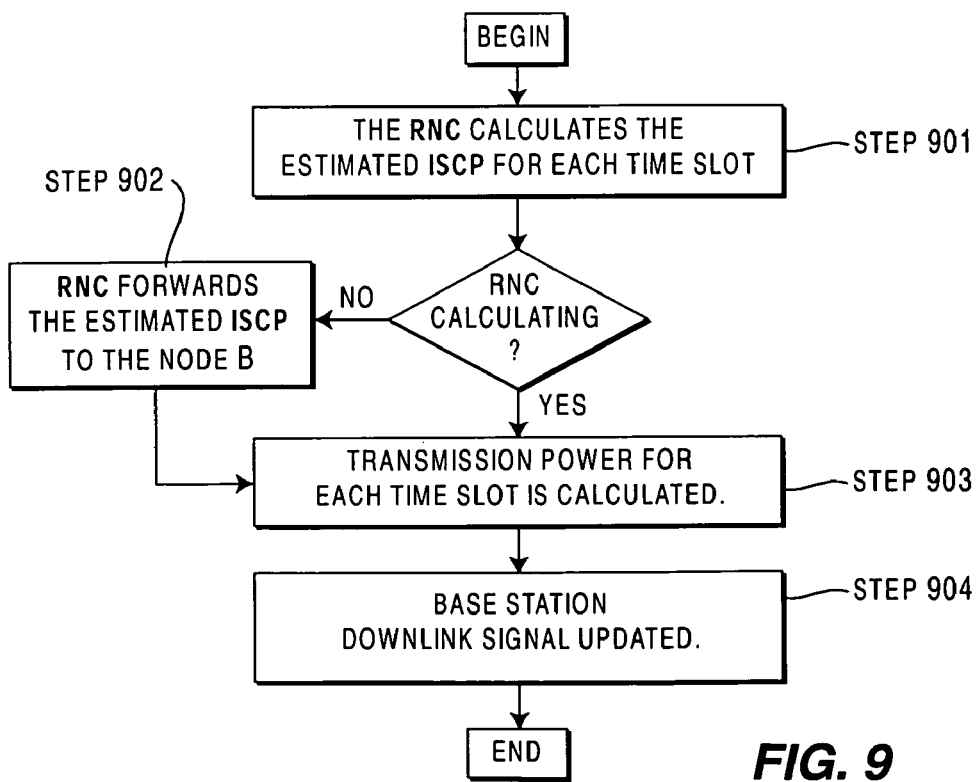
FIG. 9 illustrates a flow diagram of a fifth embodiment.

Again it should be noted that the node B 26 and RNC 36 may also conduct the function of storing all required information and calculating the estimated interference and the transmit power for each time slot. Referring to FIG. 9, a flow diagram of downlink power control in accordance with this fifth embodiment is illustrated. The RNC 16 calculates an estimated interference I for each time slot (step 901). If the system is configured such that the node B 26 calculates the transmit power, the RNC 36 forwards the estimated interference I to the node B 26 (step 902) where the transmit power for all physical channels is calculated (step 903), and the base station downlink signal updated (step 904). Otherwise the RNC 36 calculates the transmission power for each the slot (step 903).

Since physical channels are allocated by the RNC in advance of actual physical transmission, it is possible for a Node B to calculate the expected UE interference for the frame being transmitted in real time. The real time interference calculation allows for the correct transmission power for each time slot for the frame being transmitted.

A sixth embodiment of the present invention utilizes the combination of the measured and estimated interference approaches disclosed above to control downlink power. In this approach, the base station 30$_1$ combines weighted interference values for both the estimated interference and measured interference to calculate the transmission power per time slot of the CCTrCH. For MUD UE, the relevant interference (that affects detection performance) in each slot is denoted as:

$$I_D(n)=\Sigma P_j(n)L_j(n) \qquad \text{Equation 5}$$

all j≠0 where $P_j(n)$ is the transmission power of base station j at time n in a certain slot, $P_0$, being the transmission power of the UE's base station 30$_1$. $L_j(n)$ denoting the corresponding path loss. For a non-MUD UE, the relevant interference is denoted as:

$$I_D(n)=\Sigma P_j(n)L_j(n) \qquad \text{Equation 6}$$

all j

The measured interference $I_D(n)$, though, will be reported by the UE as an ISCP measurement. Equations 5 and 6 are merely illustrative of this interference present in the communication system:

The estimated interference is denoted as:

$$I(n)=\Sigma P_j(n)L_j(n) \qquad \text{Equation 7}$$

Where the summation is carried over all known interferers whose load and path loss to the UE are known. Similar to the fifth embodiment, load information is known by the base station 30$_1$ for all j. Any interference from a load UE not known is designated as the residual interference $I_f(n)$, $I_f(n)=I(n)-I_D(n)$. From each of these interference values, the transmission power device 698 combines them to generate a more accurate interference power value to be used in the estimation of the downlink transmission power for each time slot, defined by Equations 1 thru 4. The combined interference power value is defined as:

$$I=\alpha I_f+\beta I+\gamma I_D, \ \alpha+\beta+\gamma=1 \qquad \text{Equation 8}$$

where coefficients $\alpha$, $\beta$ and $\gamma$ are determined per system or even per slot according to measurement delays or existence of foreign base stations.

Figure 10:
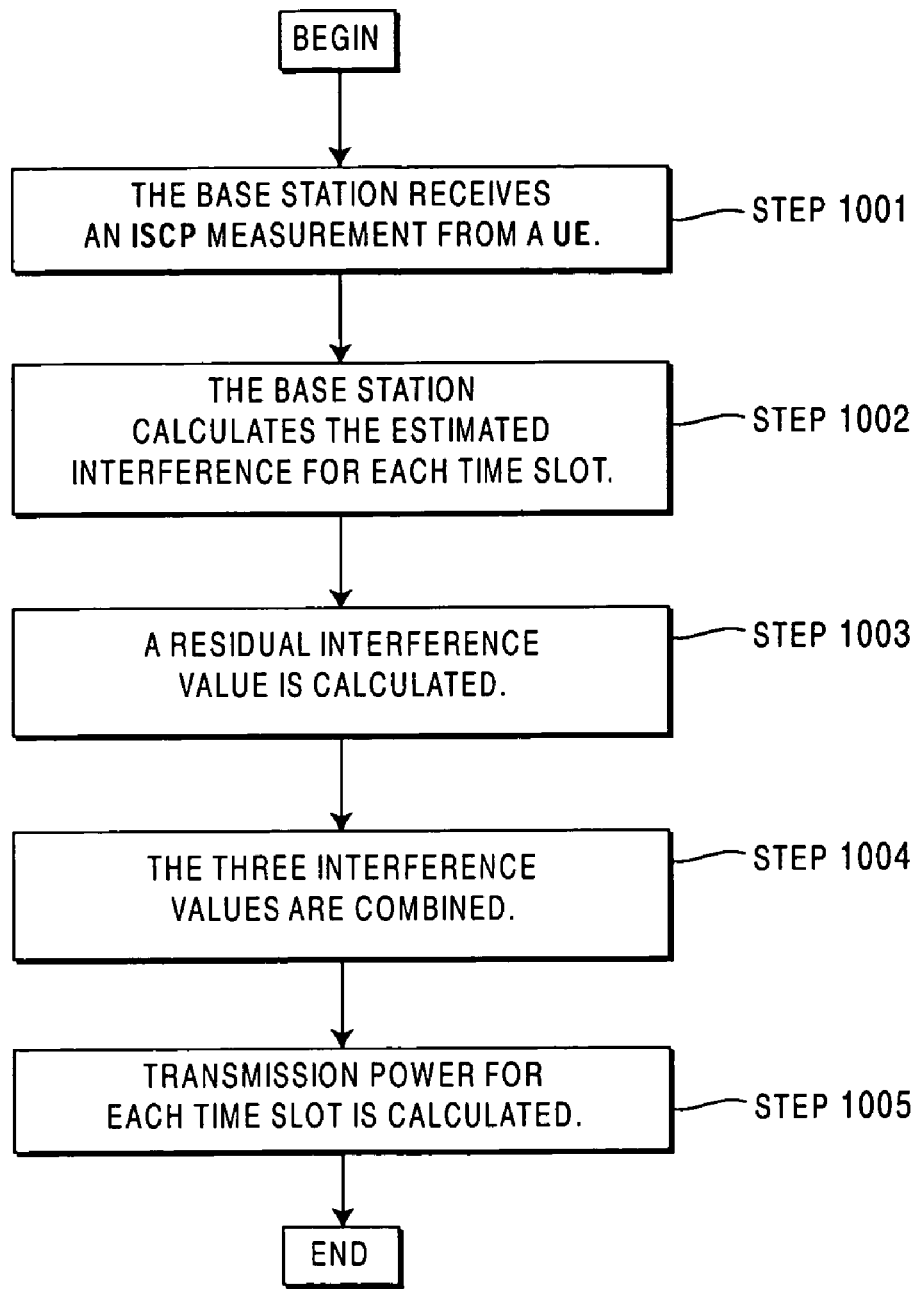
FIG. 10 illustrates a flow diagram of a sixth embodiment.

Illustrated in FIG. 10 is a flow diagram of the downlink power control system in accordance with the sixth embodiment. The base station 30$_1$ receives a communication from the UE 22 including an ISCP interference measurement $I_D$ for each time slot (step 1001). The transmission power calculation device 698 then calculates an estimated interference value I using information stored in the base station database 698 (step 1002). A residual interference value $I_F$ is then calculated by the transmission power calculation (step 1003). The transmission power calculation device then combines the three interference values $I_D$, I, $I_F$ (step 1004) and calculates the transmission power for each time slot of the downlink communication (step 1005).

Figure 11:
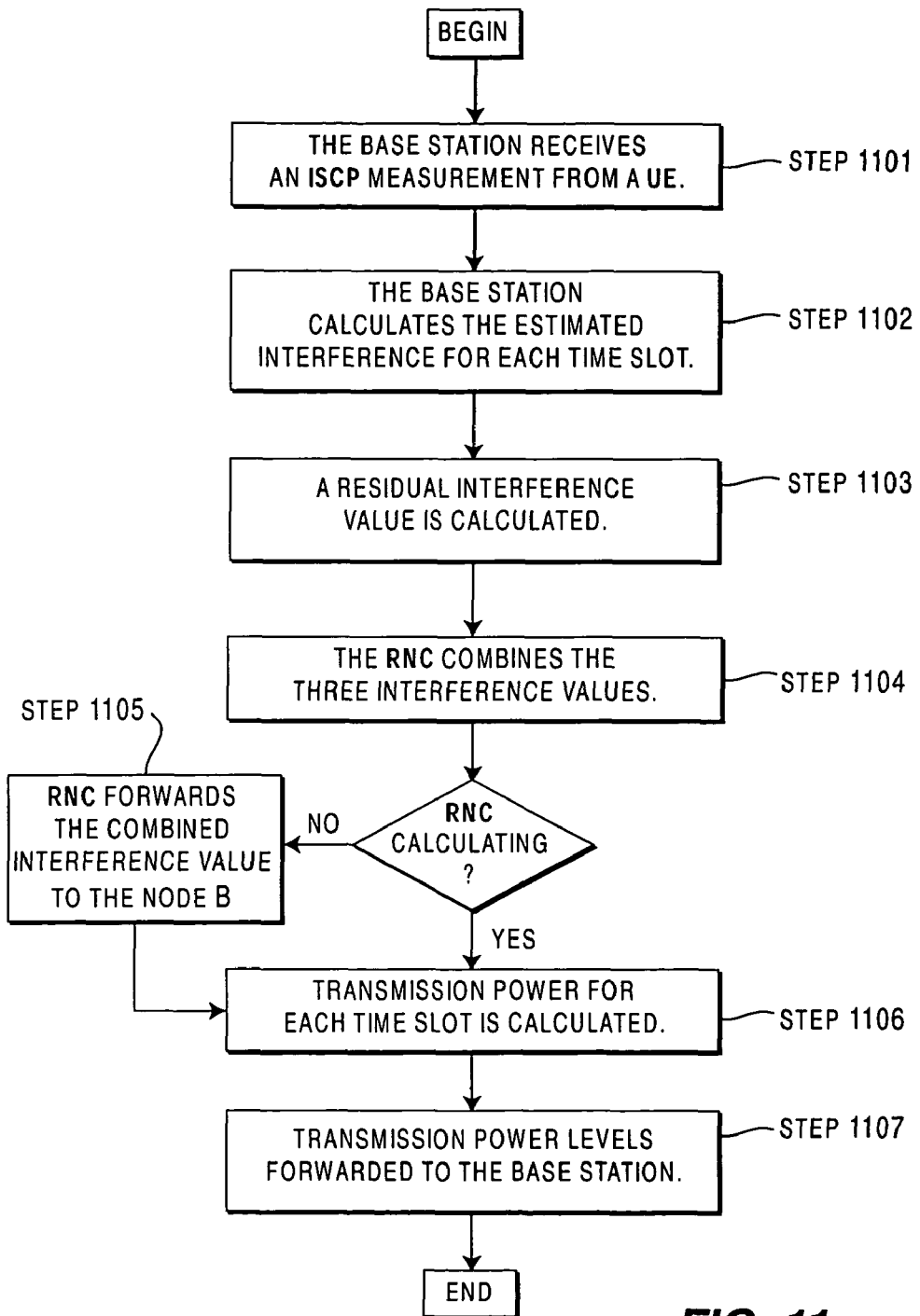
FIG. 11 illustrates a flow diagram of a seventh embodiment.

Similar to the previous embodiments, the RNC 36 and Node B 26 may calculate the transmission power for each time slot as described above in a seventh embodiment. Referring to FIG. 11, a flow diagram of this embodiment is illustrated. The RNC 36 receives a communication from the UE 22 including an ISCP interference measurement $I_D$ for each time slot. (step 1101) The RNC 36 then calculates an estimated interference value Î using information stored in the RNC 36 (step 1102) and a residual interference value $I_F$ (step 1103). The RNC 36 then combines the three interference values $I_D$, Î, $I_F$ (step 1104) and calculates the transmission power for each time slot of the downlink communication using Equations 1 thru 4 (step 1106) and forwards them to the base station 30$_1$ by way of the node B 26. (step 1107) If the downlink power control system is set up to allow the node B 26 to calculate the transmission power for each time slot, the RNC 36 forwards the combined interference value I to the node B 26 (step 1105), which calculates the transmission power for each time slot (step 1106) and forwards them to the base station (step 1107).

The benefit of providing a system which utilizes a measured ISCP value and an estimated interference value to calculate the transmission power for each time slot of the downlink communication is two fold: 1) the system provides flexibility to the calculation of transmission power in a case where the required information is not known; and 2) the system provides a more accurate estimate of the interference present in the communication system.

What is claimed is:

1. A spread spectrum time division user equipment using time slots for communication comprising:
   an antenna configured to receive data in a command per coded composite transport channel (CCTrCH) transmitted over a plurality of time slots;
   an interference power measurement device configured to measure an interference power for each time slot of the plurality of time slots:
   the antenna configured to transmit a single power command for the entire CCTrCH in response to a signal to interference ratio of the received CCTrCH and the measured interference power measurement for each time slot; and the antenna configured to receive a subsequent data in the CCTrCH communication having a transmission power level for each downlink communication time slot set individually in response to the interference power measurement for that time slot and the single power command for the entire CCTrCH.

2. The user equipment of claim 1 wherein the transmission power level of the subsequent data in the CCTrCH communication is set by establishing a transmit power level in response to the single power command for the entire CCTrCH and modifying the transmit power level in each time slot in response to the interference power measurement of that time slot.

3. The user equipment of claim 1 wherein the interference power measurements are interference signal code power (ISCP).

4. A spread spectrum time division base station using time slots for communication comprising:
   an antenna configured to receive a single power command for an entire command per coded composite transport channel (CCTrCH) and an interference power measurement for each time slot of the CCTrCH which is transmitted over a plurality of time slots; and
   the antenna configured to transmit data in the CCTrCH over the plurality of time slots and the CCTrCH having a transmission power level for each time slot set individually in response to the interference power measurement for that time slot and the single power command for the entire CCTrCH.

5. The base station of claim 4 wherein the transmission power level of the CCTrCH communication is set by establishing a transmit power level in response to the single power command for the entire CCTrCH and modifying the transmit power level in each time slot in response to the interference power measurement of that time slot.

6. The base station of claim 4 wherein the interference power measurements are interference signal code power (ISCP).

7. A spread spectrum time division UE using time slots for communication, the time slots being subject to power control, comprising:
   an antenna configured to receive a downlink command per coded composite transport channel (CCTrCH);
   a transmit power calculation device configured to transmit transport power control (TPC) commands, wherein the transmit power calculation device transmits one TPC command per entire downlink CCTrCH channel; which TPC command corresponds to the average signal to interference ratio (SIR) in all time slots that belong to the same CCTrCH channel; and
   an interference measurement device configured to perform a downlink interference signal code power (ISCP) measurement for each time slot in the received CCTrCH channel and to transmit the ISCP measurements to a base station; and
   wherein the antenna is further configured to receive, in response to the transmission of the ISCP measurement and the TPC command for the entire CCTrCH channel, a downlink CCTrCH communication having an individual transmission power level for each downlink CCTrCH channel time slot.

* * * * *

UNITED STATES PATENT AND TRADEMARK OFFICE
CERTIFICATE OF CORRECTION

PATENT NO. : 8,045,520 B2  
APPLICATION NO. : 09/845803  
DATED : October 25, 2011  
INVENTOR(S) : Zeira et al.

Page 1 of 1

It is certified that error appears in the above-identified patent and that said Letters Patent is hereby corrected as shown below:

ON THE TITLE PAGE

At section (56) U.S. Patent Documents, page 1, left column, after "5,461,639 A * 10/1995 Wheatley", insert --III,--.

IN THE DRAWINGS

Figure 7:
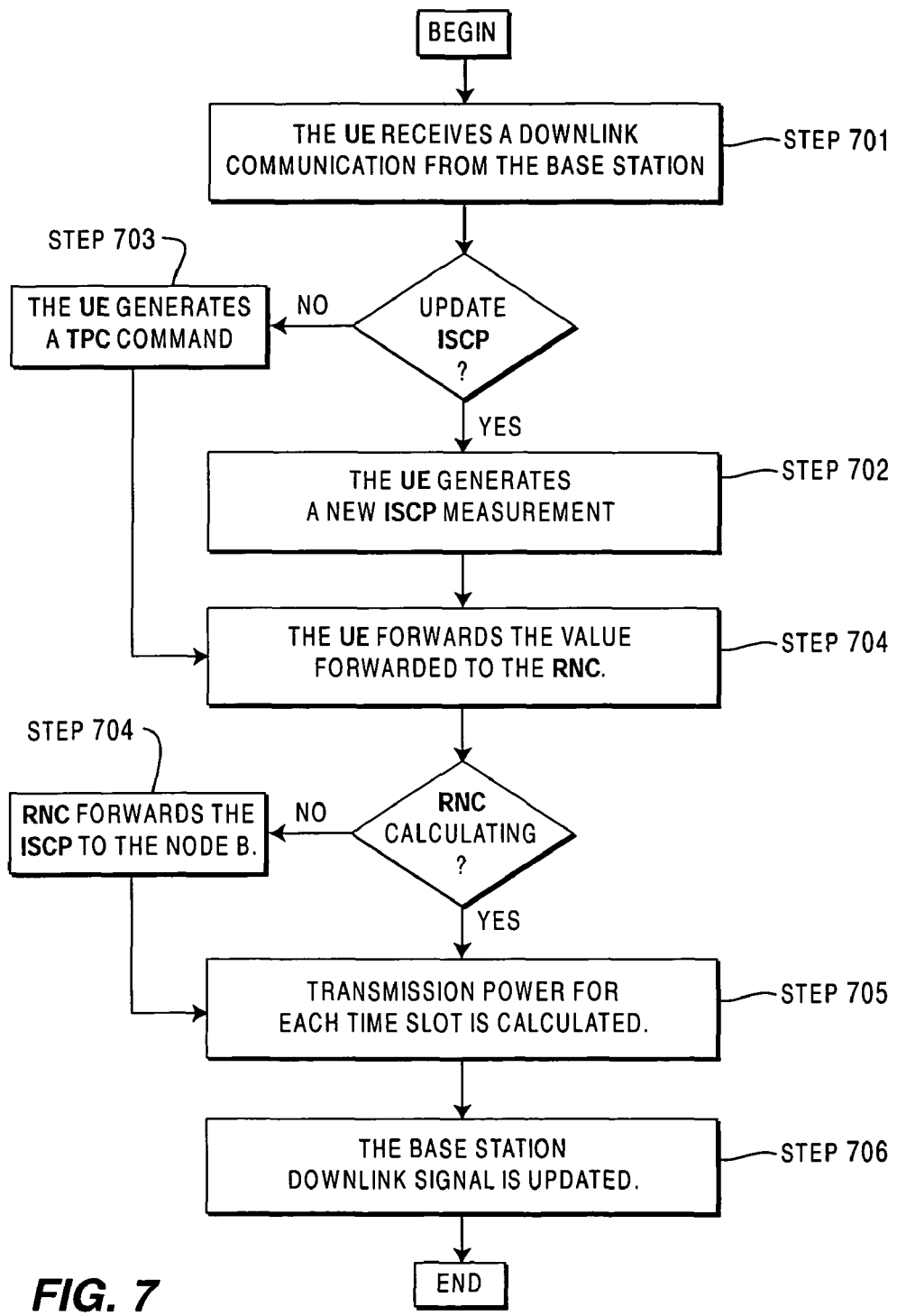
FIG. 7 illustrates a flow diagram of a third embodiment.

On sheet 7, FIG. 7, for the box labeled "THE UE FORWARDS THE VALUE FORWARDED TO THE RNC", delete reference numeral "STEP 704" and insert therefore reference numeral --STEP 707--.

On sheet 7, FIG. 7, for the box labeled "THE UE FORWARDS THE VALUE FORWARDED TO THE RNC", after "THE UE FORWARDS THE VALUE", delete "FORWARDED".

IN THE SPECIFICATION

At column 6, line 3, after "base station", delete "30" and insert therefore --$30_1$--.

At column 6, line 19, after the word "communication", insert --(step 702)--.

At column 6, line 20, after "RNC 36 (step", delete "702" and insert therefore --707--.

At column 6, line 25, after "(step", delete "704" and insert therefore --705--.

At column 6, line 29, after "(step", delete "705" and insert therefore --704--.

At column 7, line 14, after "downlink signal", delete "is updated".

At column 7, line 27, after "for each", delete "the" and insert therefore --time--.

Signed and Sealed this  
Ninth Day of April, 2013

Teresa Stanek Rea  
*Acting Director of the United States Patent and Trademark Office*